(12) United States Patent
Liu

(10) Patent No.: US 7,001,034 B1
(45) Date of Patent: Feb. 21, 2006

(54) POINTER FOR METER

(75) Inventor: Wan-Ping Liu, Taipai (TW)

(73) Assignee: Trisco Technology Corp., Taipei (TW)

( * ) Notice: Subject to any disclaimer, the term of this patent is extended or adjusted under 35 U.S.C. 154(b) by 0 days.

(21) Appl. No.: 10/905,639

(22) Filed: Jan. 14, 2005

(51) Int. Cl.
*G01D 11/28* (2006.01)

(52) U.S. Cl. .................................. 362/26; 116/DIG. 36

(58) Field of Classification Search ................. 362/23, 362/25, 26, 28; 116/48, 286, 288, DIG. 6, 116/DIG. 36

See application file for complete search history.

(56) References Cited

U.S. PATENT DOCUMENTS 5,142,453 A * 8/1992 Ohta et al. .................. 362/29
5,414,595 A * 5/1995 Oike et al. .................. 362/26
5,678,913 A * 10/1997 Ishimaru et al. ............ 362/26

\* cited by examiner

*Primary Examiner*—Y. My Quach-Lee

(57) ABSTRACT

A pointer pivotally mounted in a meter for pointing out the graduations of a scale is disclosed to include a base and a pointing tip extending from the base, which pointing tip having the outside wall extending along the length of the pointing tip and covered with a layer of reflective material and a visible light-penetrable peripheral surface for guiding in external light toward the reflective material.

3 Claims, 5 Drawing Sheets

POINTER FOR METER

BACKGROUND OF THE INVENTION

1. Field of the Invention

The present invention relates to pointer for meter and more particularly, to a pointer with a pointing tip that has a visible light-penetrable peripheral surface and a layer of reflective material coated on the pointing tip for reflecting incident light out of the visible light-penetrable peripheral surface in different directions to enhance the visibility of the indication of the pointing tip.

2. Description of the Related Art

A variety of meters and gauges are known for measuring the amount or speed of fluid or gas, or for indicating direction or time. For example, a motor vehicle generally has a fuel indicator/gas gauge to indicate the amount of fuel oil, an oil pressure gauge to indicate the pressure of fuel oil, an engine temperature gauge to indicate engine temperature, a tachometer to measure engine speed, and an odometer to measure the distance traveled by the vehicle. A meter generally uses a pointer to indicate the amount or value measured.

Further, when projects light onto a flat surface, it will be reflected in a particular direction. However, a flat plane may be unable to effectively reflect incident light that comes from an excessively big or small angle, thereby producing dispersed light. The pointer of a meter generally uses external light to produce a reflecting effect, enabling a person to view the indication. The pointer of a meter may have a rectangular or triangular cross section as shown in FIGS. 4 and 5. The pointer A has the bottom wall covered with a layer of reflective material A1. According to the design shown in FIG. 4, the reflective material A1 coated bottom wall can only reflect incident light that passes vertically through the top wall toward the bottom wall. According to the design shown in FIG. 5, the reflective material A1 coated bottom wall can only reflect incident light that passes perpendicularly through the other two sidewalls. According to the prior art designs shown in FIGS. 4 and 5, the reflective material A1 coated bottom wall can only reflect a small mount of external light source, resulting in low visibility of the indication of the pointer A.

In general, conventional pointers have the following drawbacks.

1. The sharp turning angles of the rectangular or triangular cross section tend to reflect external light, therefore only a small amount of incident light passes to the inside of the pointer, resulting in low visibility of the indication of the pointer.
2. The peripheral sides of the rectangular or triangular cross section of the pointer tend to reflect external light, thereby causing the user unable to well see the location of indication of the pointer.

SUMMARY OF THE INVENTION

The present invention has been accomplished under the circumstances in view. It is therefore the main object of the present invention to provide a pointer, which effectively reflects incident light to enhance the visibility of the location of indication. To achieve this and other objects of the present invention, the pointer is pivotally mounted in a meter for pointing out the graduations of a scale, comprising a base and a pointing tip extending from the base. The pointing tip has the outside wall extending along the length of the pointing tip and covered with a layer of reflective material, and a visible light-penetrable peripheral surface for guiding in external light toward the reflective material. Further, a light emitting device, for example, a light emitting diode is mounted in the base of the pointer and adapted to emit light toward the pointing tip.

DETAILED DESCRIPTION OF THE EMBODIMENT

Figure 1:
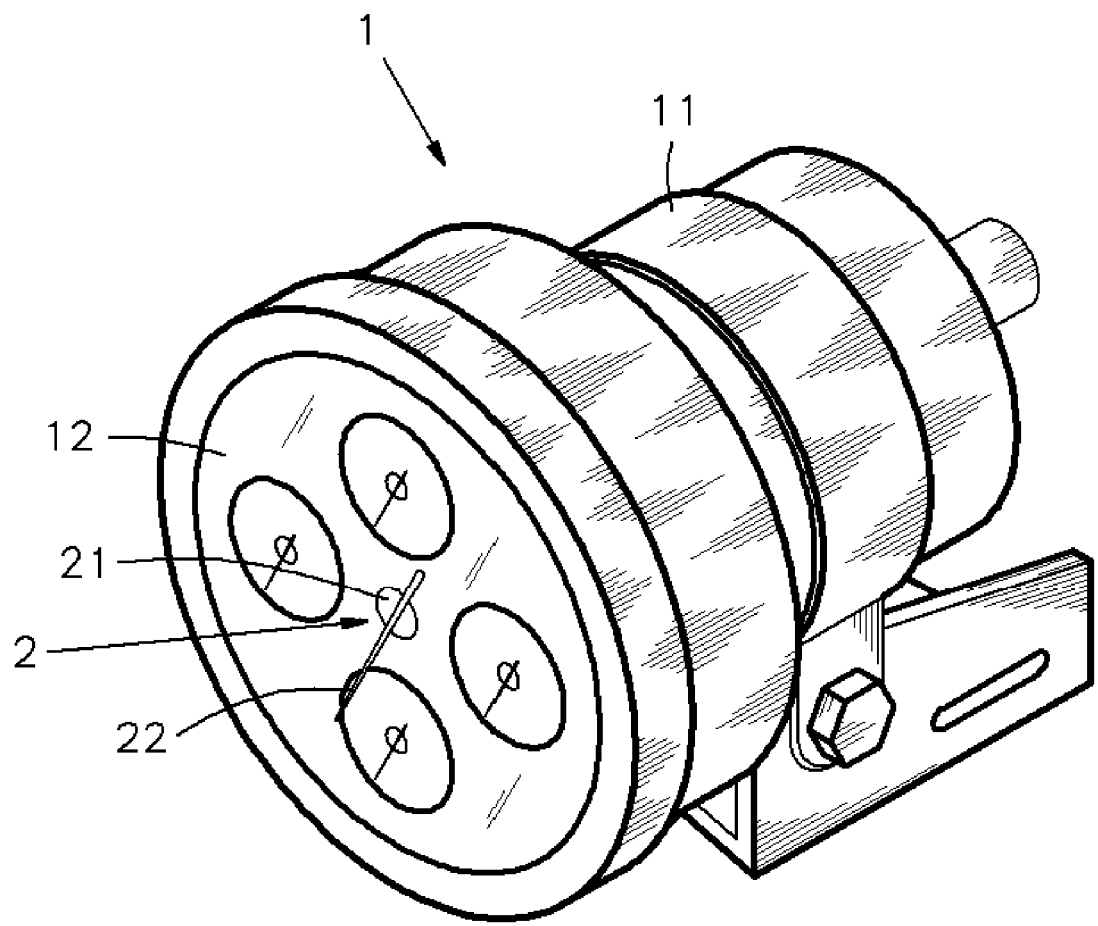
FIG. 1 is an applied view of the present invention showing a pointer used in a meter according to the present invention.
Figure 2:
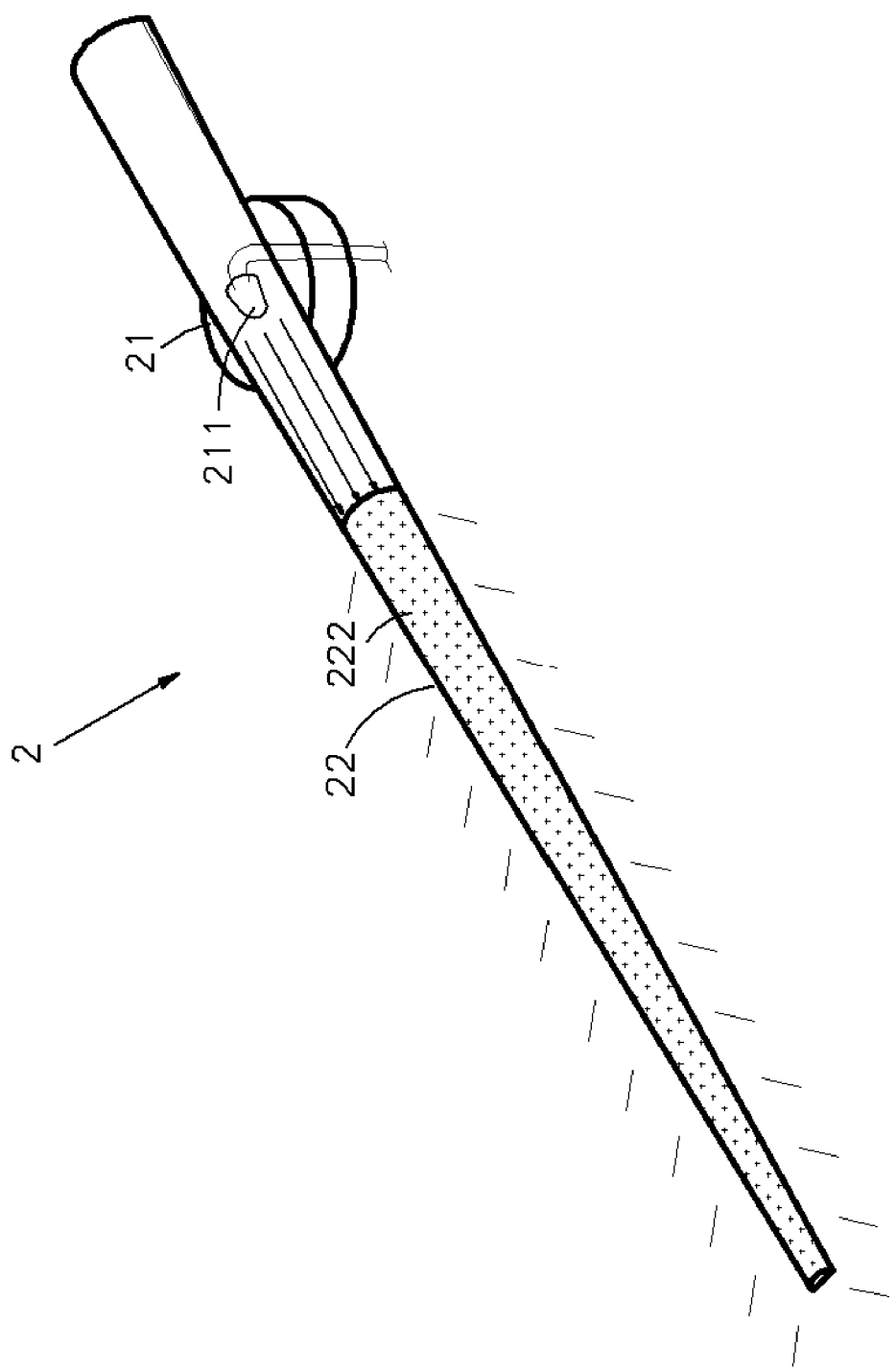
FIG. 2 is a schematic side view of the pointer according to the present invention.

Referring to FIGS. 1 and 2, a meter 1 is showing comprising a housing 11, a faceplate 12 at the front side of the housing 11, and a pointer 2 pivotally provided at the faceplate 12 for pointing out the graduations or signs of a scale or the like on the faceplate 12. The pointer 2 comprises a base 21 and a pointing tip 22 extending from the base 21. The pointing tip 22 is made of a material that admits light, having a semicircular cross section, a layer of reflective material 221 coated on the pointing tip 22, and a visible light-penetrable peripheral surface 222. Incident light passes through the visible light-penetrable peripheral surface 222 to the reflective material 221 that reflects incident light out of the pointing tip 22 through the visible light-penetrable peripheral surface 222 in different directions, thereby enhancing the visibility of the indication of the pointing tip 22.

Figure 3:
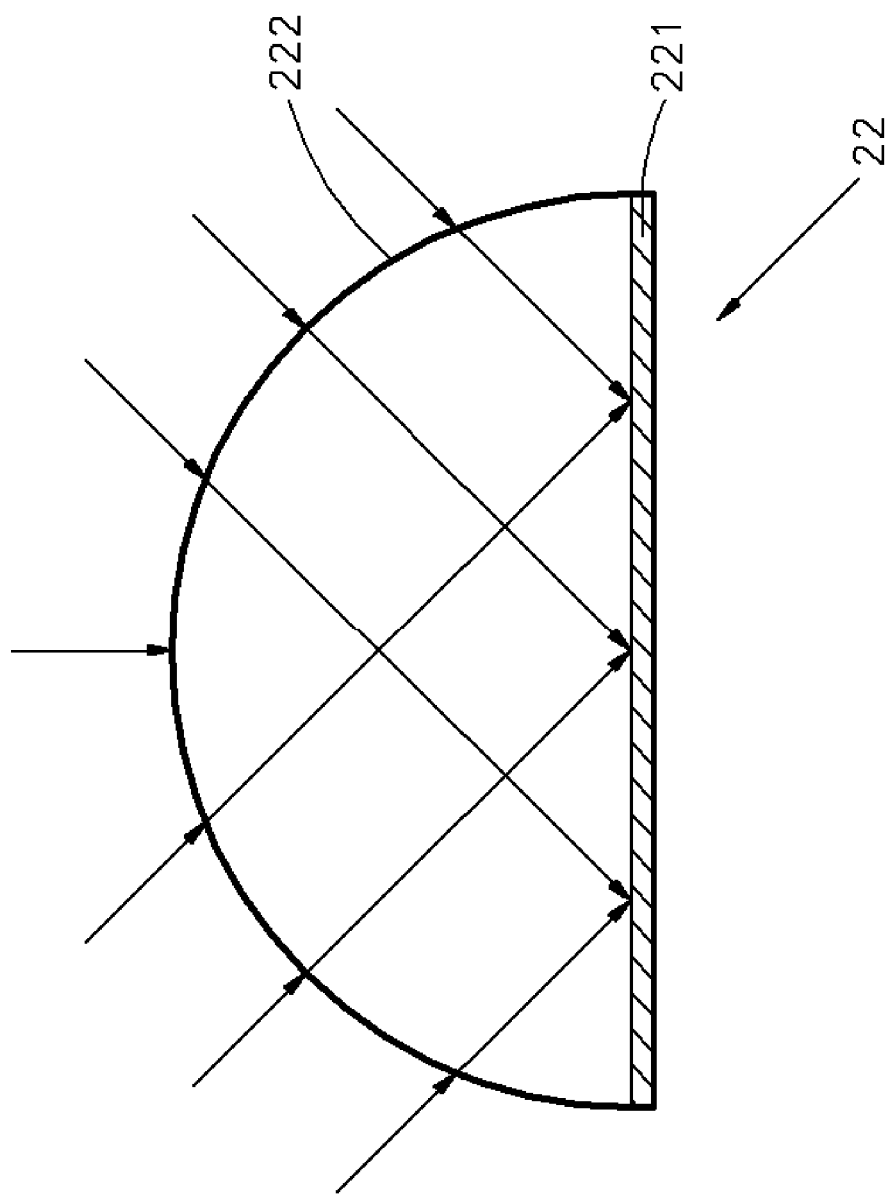
FIG. 3 is a cross sectional view in an enlarged scale of the pointer according to the present invention.
Figure 4:
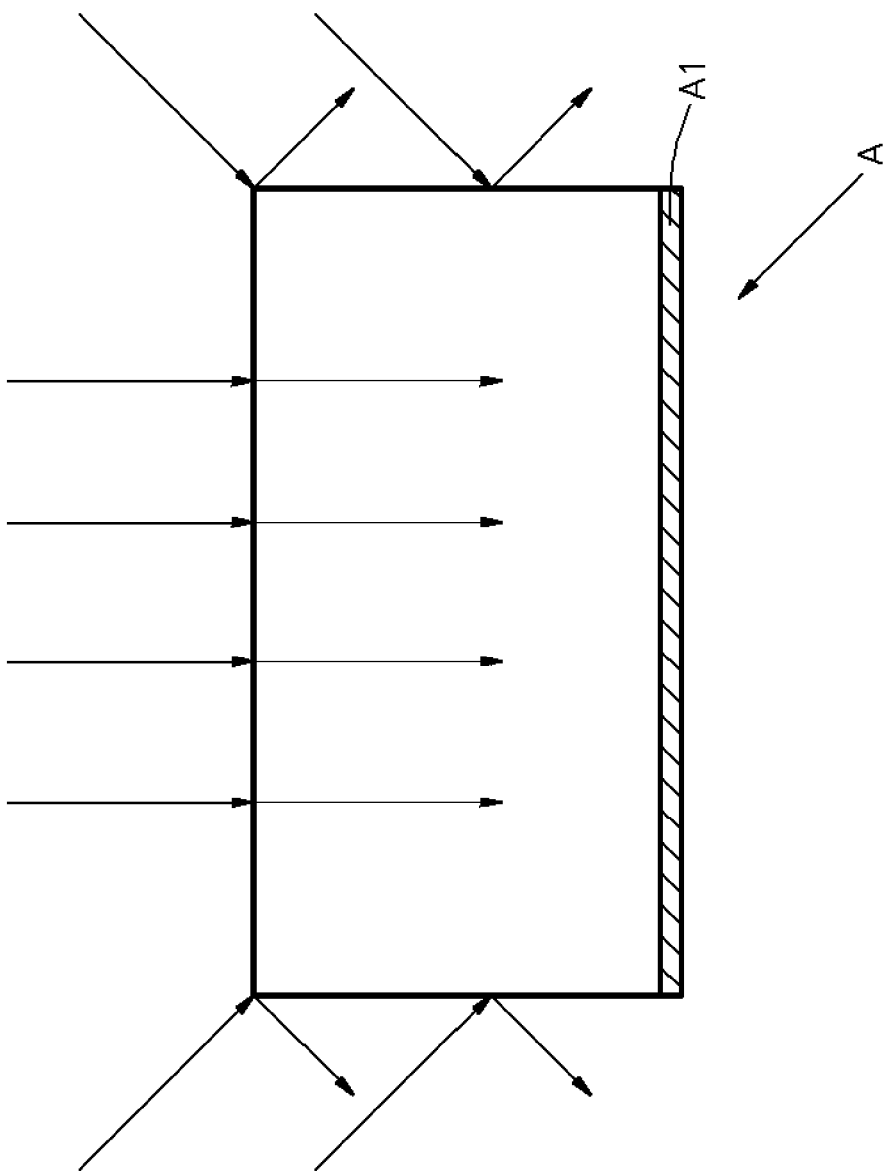
FIG. 4 is a schematic sectional view of a pointer according to the prior art.
Figure 5:
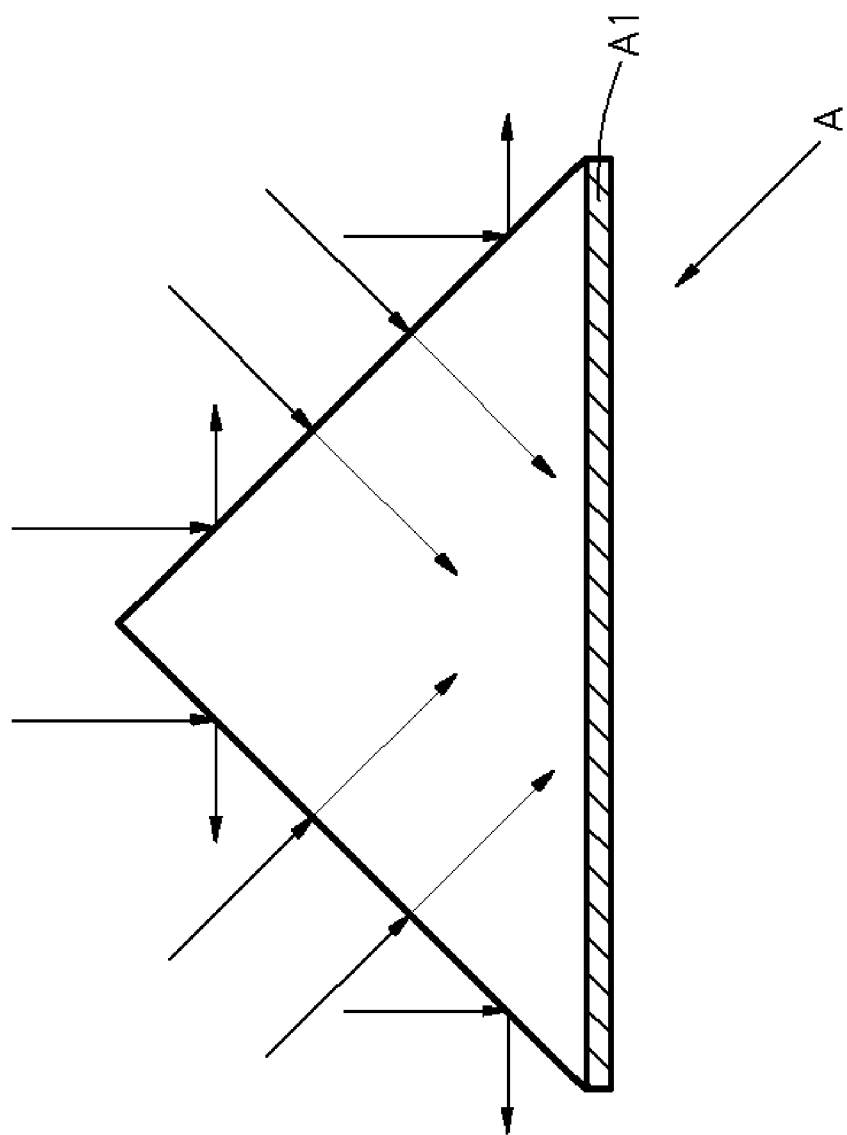
FIG. 5 is a schematic sectional of another structure of pointer according to the prior art.

Referring to FIG. 3 and FIGS. 1 and 2 again, a light emitting device, for example, a LED (light emitting diode) 211 is mounted in the base 21 and aimed at the pointing tip 22. When turned on the LED 211 to give off light, light passes into the inside of the pointing tip 22 and is reflected by the reflective material 221 in different directions to enhance the visibility of the indication of the pointing tip 22.

A prototype of pointer has been constructed with the features of FIGS. 1~3. The pointer functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pointer pivotally mounted in a meter for pointing out the graduations of a scale, comprising a base and a pointing tip extending from said base, said pointing tip having a semicircular cross section including a flat bottom surface and a convex light-penetrable surface, and an outside wall extending along a length of said pointing tip, wherein said flat bottom surface is covered with a layer of reflective material and said convex light-penetrable peripheral surface is adopted for guiding in external light toward said reflective material.

2. The pointer as claimed in claim 1, further comprising a light emitting device mounted in said base and adapted to emit light toward said pointing tip.

3. The pointer as claimed in claim 1, wherein said light emitting device is a light emitting diode.

* * * * *